(12) United States Patent
Ren et al.

(10) Patent No.: US 12,095,698 B2
(45) Date of Patent: Sep. 17, 2024

(54) SIGNAL TRANSMISSION METHOD AND DEVICE

(71) Applicant: DATANG MOBILE COMMUNICATIONS EQUIPMENT CO., LTD., Beijing (CN)

(72) Inventors: Bin Ren, Beijing (CN); Deshan Miao, Beijing (CN); Ren Da, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 493 days.

(21) Appl. No.: 17/623,520

(22) PCT Filed: Jun. 30, 2020

(86) PCT No.: PCT/CN2020/099582
§ 371 (c)(1),
(2) Date: Dec. 28, 2021

(87) PCT Pub. No.: WO2021/000872
PCT Pub. Date: Jan. 7, 2021

(65) Prior Publication Data
US 2022/0416975 A1 Dec. 29, 2022

(30) Foreign Application Priority Data
Jul. 4, 2019 (CN) .......................... 201910599065.5

(51) Int. Cl.
*H04L 5/00* (2006.01)
*H04L 27/26* (2006.01)

(52) U.S. Cl.
CPC .......... *H04L 5/0051* (2013.01); *H04L 5/005* (2013.01); *H04L 27/26025* (2021.01); *H04L 27/2613* (2013.01)

(58) Field of Classification Search
CPC . H04L 5/0051; H04L 5/005; H04L 27/26025; H04L 27/2613; H04L 5/0048;
(Continued)

(56) References Cited

U.S. PATENT DOCUMENTS 9,766,323 B2 9/2017 Liu
9,769,621 B2 9/2017 Xiao et al.
(Continued)

FOREIGN PATENT DOCUMENTS

CN 103634899 A 3/2014
CN 103703841 A 4/2014
(Continued)

OTHER PUBLICATIONS

3GPP TSG-RAN WG2 Meeting #106, "On-demand PRS transmission," Reno, U.S., May 13-17, 2019.
(Continued)

*Primary Examiner* — Hoang-Chuong Q Vu
(74) *Attorney, Agent, or Firm* — Meunier Carlin & Curfman LLC

(57) ABSTRACT

The present application discloses a signal transmission method and a device, for achieving PRS transmission supporting different bandwidths and numerology. The embodiment of the present application provides a signal transmission method, the method includes: receiving and measuring a cell-level cell-specific first positioning reference signal PRS in a cell public measurement window, to obtain a first positioning measurement value, and applying to the network side for a terminal-level UE-specific second PRS resource in a non-cell public measurement window based on the first positioning measurement value; receiving and measuring the UE-specific second PRS in the non-cell public measurement window, to obtain a second positioning measurement value; determining and reporting a third positioning mea-
(Continued)

surement value based on the first positioning measurement value and the second positioning measurement value.

20 Claims, 5 Drawing Sheets

(58) Field of Classification Search
CPC .... G01S 5/0205; G01S 5/0036; H04W 64/00; H04W 24/02; H04W 24/10
See application file for complete search history.

(56) References Cited

U.S. PATENT DOCUMENTS

| | | | |
|---|---|---|---|
| 10,120,060 B2 | 11/2018 | Jain et al. | |
| 10,349,371 B2* | 7/2019 | Park | H04W 64/00 |
| 10,862,530 B2 | 12/2020 | Chen et al. | |
| 11,914,060 B2* | 2/2024 | Wang | H04W 72/0453 |
| 2013/0336224 A1* | 12/2013 | Davydov | H04W 52/0251 370/328 |
| 2017/0111880 A1* | 4/2017 | Park | H04W 64/00 |
| 2017/0318556 A1 | 11/2017 | Lu et al. | |
| 2017/0332342 A1 | 11/2017 | Lu et al. | |
| 2018/0048444 A1* | 2/2018 | Park | H04L 5/0048 |
| 2021/0286042 A1* | 9/2021 | Xiong | G01S 5/10 |
| 2022/0124664 A1* | 4/2022 | Cha | H04L 5/0048 |
| 2022/0150865 A1* | 5/2022 | Cha | G01S 5/011 |

FOREIGN PATENT DOCUMENTS

| | | |
|---|---|---|
| CN | 104469930 A | 3/2015 |
| CN | 104469931 A | 3/2015 |
| CN | 104869590 A | 8/2015 |
| CN | 107465497 A | 12/2017 |
| CN | 109845172 A | 6/2019 |
| CN | 109845173 A | 6/2019 |
| WO | 2017029213 A1 | 2/2017 |

OTHER PUBLICATIONS

3GPP TSG RAN WG1 WGA Ad-Hoc Meeting 1901, "DL only based Positioning," R1-1901090, Taipei, Taiwan, Jan. 21-25, 2019.
3GPP TSG-RAN WG1 Meeting AH1901, "RAT-dependent DL-only NR positioning techniques," R1-1900914, Taipei, Taiwan, Jan. 21-25, 2019.
3GPP TSG RAN WG1 Ad-Hoc Meeting 1901, "Analysis of Techniques for NR DL Positioning," R1-1900512, Taipei, Taiwan, Jan. 21-25, 2019.
Discussion on physical-layer procedures to support NR positioning measurements, 3GPP TSG RAN WG1 #97 R1-1906526, May 2019.
Discussion on necessity of physical-layer procedure to support UE/bNB measurements, 3GPP TSG RAN WG1 #96bis R1-1904741, Apr. 2019.
Discussion on reference signal design for NR positioning, 3GPP TSG RAN WG1 #96bis R-1904740, Apr. 2019.

\* cited by examiner

SIGNAL TRANSMISSION METHOD AND DEVICE

CROSS-REFERENCE OF RELATED APPLICATIONS

The present application is a US National Stage of International Application No. PCT/CN2020/099582, filed on Jun. 30, 2020, which claims priority to Chinese Patent Application No. 201910599065.5, filed with the China National Intellectual Property Administration on Jul. 4, 2019 and entitled "Signal Communication Method and Apparatus", which is hereby incorporated by reference in its entirety.

FIELD

The present application relates to the field of communication technologies, and particularly to a signal communication method and apparatus.

BACKGROUND

In the 5G New Radio (NR) system, a parameter set (numerology) refers to a set of parameters and includes Sub-Carrier Spacing (SCS), symbol length, Cyclic Prefix (CP) length, etc. Different numerologies have different sub-carrier spacing and symbol durations.

The current protocol does not define a solution for a plurality of base stations (Next Generation NodeB, gNB) to use different numerologies to send the Positioning Reference Signal (PRS). The simplest solution is that the protocol stipulates that all gNBs can only use the same numerology to send the PRS. However, before the PRS communication, the numerology used by some gNBs for downlink physical channel/signal communication may be different from the numerology for the PRS. At this time, these gNBs need to perform additional Radio Frequency (RF) handover before performing the PRS communication. At the same time, the UE also needs to perform the additional RF handover before receiving the PRS of these gNBs. This not only brings additional complexity and delay to the PRS communication, but also brings additional complexity and delay to communication of conventional data services of the gNB and UE.

FIG. 1 shows a schematic diagram of PRS occasion, PRS resource sets and PRS resources, where the PRS occasion defined by the current new NR protocol uses a slot as a basic unit and includes one or more PRS resource sets, and each PRS resource set includes one or more PRS resources.

The current NR protocol does not define a solution for a plurality of gNBs to use different numerologies to send the PRS. If the protocol stipulates that all gNBs can only use the same numerology to send the PRS, when the numerology for the downlink physical channel/signal communication is different from the numerology for the PRS, the additional complexity and delay effects of the RF handover may be produced, and the additional processing complexity and delay of the gNB and UE may be increased.

SUMMARY

Embodiments of the present application provide a signal communication method and apparatus, to realize the PRS communication supporting different signal bandwidths and numerologies.

On the terminal side, a signal communication method provided by an embodiment of the present application includes: receiving and measuring a cell-specific first PRS in a cell public measurement window to obtain a first positioning measurement value, and applying for a UE-specific second PRS resource in a non-cell public measurement window from a network side based on the first positioning measurement value; receiving and measuring the UE-specific second PRS in the non-cell public measurement window to obtain a second positioning measurement value; determining and reporting a third positioning measurement value based on the first positioning measurement value and the second positioning measurement value.

Through this method, the cell-specific first PRS is received and measured in the cell public measurement window to obtain the first positioning measurement value, and the UE-specific second PRS resource in the non-cell public measurement window is applied for from the network side based on the first positioning measurement value; the UE-specific second PRS is received and measured in the non-cell public measurement window to obtain the second positioning measurement value; and the third positioning measurement value is determined and reported based on the first positioning measurement value and the second positioning measurement value, thereby implementing the PRS communication supporting different signal bandwidths and numerologies. Compared with the related art, the complexity and delay impact of additional RF handover are decreased, and the additional processing complexity and delay of the gNB and UE are reduced.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, applying for the UE-specific second PRS resource in the non-cell public measurement window from the network side based on the first positioning measurement value, includes: comparing the first positioning measurement value with a preset threshold value, and applying for the UE-specific second PRS resource in the non-cell public measurement window from the network side according to a comparison result.

Optionally, the method further includes: receiving one or more of following configuration information through broadcast signaling, Radio Resource Control (RRC) signaling, Downlink Control Information (DCI) or dedicated positioning signaling: configuration information of the cell public measurement window; configuration information of the non-cell public measurement window; configuration information of the cell-specific first PRS resource; configuration information of the UE-specific second PRS resource.

Optionally, the third positioning measurement value is determined based on the first positioning measurement value and the second positioning measurement value by one of: linear weighted combination; selecting a maximum value; selecting a minimum value.

Optionally, applying for the UE-specific second PRS resource in the non-cell public measurement window from the network side based on the first positioning measurement value, includes: applying for a second PRS resource occupying a larger signal bandwidth and/or more OFDM symbols than a first PRS resource when an error of the first positioning measurement value is greater than a first threshold value, where the first PRS resource is the resource configured for the first PRS from the network side; applying for a second PRS resource occupying a smaller signal bandwidth and/or fewer OFDM symbols than the first PRS resource from the network side when the error of the first positioning measurement value is not greater than the first threshold value.

Correspondingly, on the network side, a signal communication method provided by an embodiment of the present application includes: sending a cell-specific first PRS in a cell public measurement window so that a terminal receives and measures the cell-specific first PRS in the cell public measurement window to obtain a first positioning measurement value; sending a UE-specific second PRS in a non-cell public measurement window so that the terminal receives and measures the UE-specific second PRS in the non-cell public measurement window to obtain a second positioning measurement value; receiving a third positioning measurement value determined and reported by the terminal based on the first positioning measurement value and the second positioning measurement value, and using the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the method further includes: notifying the terminal of one or more of following configuration information through broadcast signaling, RRC signaling, DCI or dedicated positioning signaling: configuration information of the cell public measurement window; configuration information of the non-cell public measurement window; configuration information of the cell-specific first PRS resource; configuration information of the UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Optionally, the method includes: determining a relationship among N*M activated BandWidth Parts, BWPs, of N target UEs that need to be positioned in M different cells, where N is greater than or equal to 1, and M is greater than or equal to 3; configuring PRS resources respectively on the N*M activated BWPs in the M different cells for the N target UEs in case of complete orthogonality in frequency domain, where the N target UEs are multiplexed by Frequency Division Multiplexing (FDM) or by the FDM combined with Time Division Multiplexing (TDM) in the M different cells; multiplexing PRSs of different target UEs by the TDM and then multiplexing PRSs of a same target UE in different cells by the FDM or by the FDM combined with the TDM in case of incomplete orthogonality in frequency domain; or multiplexing PRSs of different target UEs with different numerologies in different cells by the TDM and then multiplexing PRSs of different target UEs with a same numerology in different cells by the FDM or by the FDM combined with the TDM in case of incomplete orthogonality in frequency domain.

On the terminal side, a signal communication apparatus provided by an embodiment includes: a memory configured to store program instructions; a processor configured to invoke the program instructions stored in the memory, and perform according to an obtained program: receiving and measuring a cell-specific first PRS in a cell public measurement window to obtain a first positioning measurement value, and applying for a UE-specific second PRS resource in a non-cell public measurement window from a network side based on the first positioning measurement value; receiving and measuring the UE-specific second PRS in the non-cell public measurement window to obtain a second positioning measurement value; determining and reporting a third positioning measurement value based on the first positioning measurement value and the second positioning measurement value.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, applying for the UE-specific second PRS resource in the non-cell public measurement window from the network side based on the first positioning measurement value, includes: comparing the first positioning measurement value with a preset threshold value, and applying for the UE-specific second PRS resource in the non-cell public measurement window from the network side according to a comparison result.

Optionally, the processor is further configured to: receive one or more of following configuration information through broadcast signaling, RRC signaling, DCI or dedicated positioning signaling: configuration information of the cell public measurement window; configuration information of the non-cell public measurement window; configuration information of the cell-specific first PRS resource; configuration information of the UE-specific second PRS resource.

Optionally, the third positioning measurement value is determined based on the first positioning measurement value and the second positioning measurement value by one of: linear weighted combination; selecting a maximum value; selecting a minimum value.

Optionally, the processor applying for the UE-specific second PRS resource in the non-cell public measurement window from the network side based on the first positioning measurement value, includes: applying for a second PRS resource occupying a larger signal bandwidth and/or more OFDM symbols than a first PRS resource when an error of the first positioning measurement value is greater than a first threshold value, where the first PRS resource is the resource configured for the first PRS from the network side; applying for a second PRS resource occupying a smaller signal bandwidth and/or fewer OFDM symbols than the first PRS resource from the network side when the error of the first positioning measurement value is not greater than the first threshold value.

Correspondingly, on the network side, a signal communication apparatus provided by an embodiment of the present application includes: a memory configured to store program instructions; a processor configured to invoke the program instructions stored in the memory, and perform according to an obtained program: sending a cell-specific first PRS in a cell public measurement window so that a terminal receives and measures the cell-specific first PRS in the cell public measurement window to obtain a first positioning measurement value; sending a UE-specific second PRS in a non-cell public measurement window so that the terminal receives and measures the UE-specific second PRS in the non-cell public measurement window to obtain a second positioning measurement value; receiving a third positioning measurement value determined and reported by the terminal based on the first positioning measurement value and the second positioning measurement value, and using the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the processor is further configured to: notify the terminal of one or more of following configuration information through broadcast signaling, RRC signaling, DCI or dedicated positioning signaling: configuration information of the cell public measurement window; configuration information of the non-cell public measurement window; configuration information of the cell-specific first PRS resource; configuration information of the UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Optionally, the processor is further configured to: determine a relationship among N*M activated BandWidth Parts, BWPs, of N target UEs that need to be positioned in M different cells, where N is greater than or equal to 1, and M is greater than or equal to 3; configure PRS resources respectively on the N*M activated BWPs in the M different cells for the N target UEs in case of complete orthogonality in frequency domain, where the N target UEs are multiplexed by FDM or by FDM combined with TDM in the M different cells; multiplex PRSs of different target UEs by the TDM and then multiplex PRSs of a same target UE in different cells by the FDM or by the FDM combined with the TDM in case of incomplete orthogonality in frequency domain; or multiplex PRSs of different target UEs with different numerologies in different cells by the TDM and then multiplex PRSs of different target UEs with a same numerology in different cells by the FDM or by the FDM combined with the TDM in case of incomplete orthogonality in frequency domain.

On the terminal side, another signal communication apparatus provided by an embodiment of the present application includes: a first measurement unit configured to receive and measure a cell-specific first PRS in a cell public measurement window to obtain a first positioning measurement value, and apply for a UE-specific second PRS resource in a non-cell public measurement window from a network side based on the first positioning measurement value; a second measurement unit configured to receive and measure the UE-specific second PRS in the non-cell public measurement window to obtain a second positioning measurement value; a third measurement unit configured to determine and report a third positioning measurement value based on the first positioning measurement value and the second positioning measurement value.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, the first measurement unit is configured to: compare the first positioning measurement value with a preset threshold value, and apply for the UE-specific second PRS resource in the non-cell public measurement window from the network side according to a comparison result.

Optionally, the apparatus further includes a unit that receives one or more of following configuration information through broadcast signaling, RRC signaling, DCI or dedicated positioning signaling: configuration information of the cell public measurement window; configuration information of the non-cell public measurement window; configuration information of the cell-specific first PRS resource; configuration information of the UE-specific second PRS resource.

Optionally, the third measurement unit determines the third positioning measurement value based on the first positioning measurement value and the second positioning measurement value by one of: linear weighted combination; selecting a maximum value; selecting a minimum value.

Optionally, the first measurement unit applying for the UE-specific second PRS resource in the non-cell public measurement window from the network side based on the first positioning measurement value, includes: applying for a second PRS resource occupying a larger signal bandwidth and/or more OFDM symbols than a first PRS resource when an error of the first positioning measurement value is greater than a first threshold value, where the first PRS resource is the resource configured for the first PRS from the network side; applying for a second PRS resource occupying a smaller signal bandwidth and/or fewer OFDM symbols than the first PRS resource from the network side when the error of the first positioning measurement value is not greater than the first threshold value.

On the network side, an embodiment of the present application provides another signal communication apparatus, including: a first sending unit configured to send a cell-specific first PRS in a cell public measurement window so that a terminal receives and measures the cell-specific first PRS in the cell public measurement window to obtain a first positioning measurement value; a second sending unit configured to send a UE-specific second PRS in a non-cell public measurement window so that the terminal receives and measures the UE-specific second PRS in the non-cell public measurement window to obtain a second positioning measurement value; a positioning unit configured to receive a third positioning measurement value determined and reported by the terminal based on the first positioning measurement value and the second positioning measurement value, and use the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the positioning unit is further configured to: notify the terminal of one or more of following configuration information through broadcast signaling, RRC signaling, DCI or dedicated positioning signaling: configuration information of the cell public measurement window; configuration information of the non-cell public measurement window; configuration information of the cell-specific first PRS resource; configuration information of the UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Optionally, the positioning unit is further configured to: determine a relationship among N*M activated BandWidth Parts, BWPs, of N target UEs that need to be positioned in M different cells, where N is greater than or equal to 1, and M is greater than or equal to 3; configure PRS resources respectively on the N*M activated BWPs in the M different cells for the N target UEs in case of complete orthogonality in frequency domain, where the N target UEs are multiplexed by FDM or by FDM combined with TDM in the M different cells; multiplex PRSs of different target UEs by the TDM and then multiplex PRSs of a same target UE in different cells by the FDM or by the FDM combined with the TDM in case of incomplete orthogonality in frequency domain; or multiplex PRSs of different target UEs with different numerologies in different cells by the TDM and then multiplex PRSs of different target UEs with a same numerology in different cells by the FDM or by the FDM combined with the TDM in case of incomplete orthogonality in frequency domain.

Another embodiment of the present application provides a computing device including a memory and a processor, where the memory is configured to store program instructions, and the processor is configured to invoke the program instructions stored in the memory and perform any one of the above-mentioned methods in accordance with the obtained program.

Another embodiment of the present application provides a computer storage medium storing computer executable instructions which are configured to cause a computer to perform any one of the above-mentioned methods.

BRIEF DESCRIPTION OF THE DRAWINGS

In order to illustrate the technical solutions in embodiments of the present application more clearly, the accompanying drawings which need to be used in describing embodiments will be introduced below briefly. Obviously the accompanying drawings described below are only some embodiments of the present application, and other accompanying drawings may also be obtained by those ordinary skilled in the art according to these accompanying drawings without creative work.

DETAILED DESCRIPTION

Figure 1:
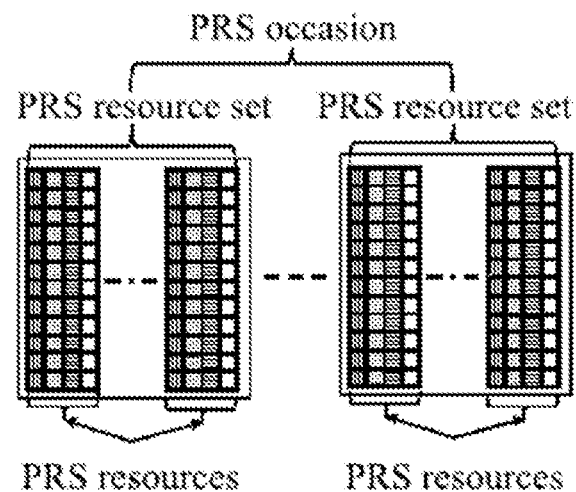
FIG. 1 is a schematic diagram of PRS occasion, PRS resource sets and PRS resources.

The technical solutions in embodiments of the present application will be described clearly and completely below in combination with the accompanying drawings in embodiments of the present application. Obviously the described embodiments are only a part of embodiments of the present application but not all embodiments. Based upon embodiments of the present application, all of other embodiments obtained by those ordinary skilled in the art without creative work pertain to the protection scope of the present application.

For the downlink Positioning Reference Signal (PRS) for positioning, it is necessary to solve the problem of how to support the PRS communication in which different base stations (gNBs) use the same numerology or different numerologies in the same PRS occasion. However, there is currently no solution for a plurality of gNBs to use different numerologies for the PRS communication.

Embodiments of the present application provide the signal communication methods and apparatuses on the terminal side and the network side, to realize the PRS communication supporting different signal bandwidths and numerologies.

Here, the method and apparatus are based on the same application concept. Since the principle of solving the problem in the method is similar to that in the apparatus, the implementations of the apparatus and method can refer to each other, and the repeated description thereof will be omitted.

The technical solutions provided by embodiments of the present application may be applicable to various systems, especially 5G systems. For example, the applicable systems may include: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device may communicate with one or more core networks via the RAN, and the wireless terminal device may be a mobile terminal, such as a mobile telephone (or called "cellular" telephone), and a computer with the mobile terminal, for example, may be a portable, pocket, handheld, computer built-in or vehicle-carried mobile device, and exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device may also be called as system, subscriber unit, subscriber station, mobile station, mobile, remote station, access point, remote terminal, access terminal, user terminal, user agent, user device, which is not limited in embodiments of the present application.

The network device involved in embodiments of the present application may be a base station, which may include a plurality of cells. Depending on specific application scenarios, the base station may also be called as access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device may further coordinate the attribute management of the air interface. For example, the network device involved in embodiments of the present application may be a network device (Base Transceiver Station (BTS)) in the Global System of Mobile communication (GSM) or Code Division Multiple Access (CDMA), or may be a network device (NodeB) in the Wideband Code Division Multiple Access (WCDMA), or may be an evolutional network device (evolutional Node B (eNB or e-NodeB)) in the Long Term Evolution (LTE) system, a 5G base station in the 5G network architecture (next generation system), or may be a Home evolved Node B (HeNB), a relay node, femto, pico, etc., which is not limited in embodiments of the present application.

Embodiments of the present application will be described below in detail with reference to the drawings of the specification. It should be noted that the showing order of embodiments of the present application only represents the sequential order of embodiments, but does not represent the pros and cons of the technical solutions provided by embodiments.

The technical solution provided by an embodiment of the present application includes following operations.

1. A UE obtains information of two PRS measurement windows pre-configured on the network side through some kind of signaling, where the two measurement windows include a cell public measurement window and a non-cell public measurement window.

2. The UE receives and measures a cell-specific first PRS (the PRS signal transmitted in the cell public measurement window is called as the first PRS in this embodiment of the present application) in the cell public measurement window, and compares obtained first positioning measurement value with a threshold value predefined or pre-configured on the network side for applying for a UE-specific second PRS resource in the non-cell public measurement window from the network side; where the cell-specific first PRS refers to a first PRS that may be obtained and measured for all UEs in the cell in the cell public measurement window, so the first PRS is cell-specific; and the UE-specific second PRS refers to a second PRS sent for a specific terminal in the non-cell public measurement window, and only the specific terminal can obtain and measure the second PRS.

3. The UE receives and measures the UE-specific second PRS (the PRS transmitted in the non-cell public measurement window is called as the second PRS in this embodiment of the present application) resource in the non-cell public PRS measurement window to obtain a second positioning measurement value.

4. The UE processes the first positioning measurement value in the cell public PRS measurement window and the second positioning measurement value obtained in the non-cell public PRS measurement window and obtains a third positioning measurement value, and then reports the third positioning measurement value to the network side for positioning the UE by the network side.

Here, the UE may receive the information of two PRS measurement windows pre-configured on the network side, the configuration information of the cell-specific first PRS resource and the configuration information of the UE-specific second PRS resource through broadcast signaling, Radio Resource Control (RRC) signaling, Downlink Control Information (DCI) or dedicated positioning signaling; the PRS signal bandwidths and numerologies in the two measurement windows may be the same or different; the first, second and third positioning measurement values include but not limited to: Reference Signal Time Difference (RSTD) (i.e., Time Difference of Arrival (TDOA)), UE receiving and sending time difference and carrier phase, etc.; the processing of the UE includes one of linear weighted combination, selecting the maximum value or selecting the minimum value.

The specific solution is introduced as follows.

On the UE side, the following processing flow is included.

Step 1, a UE obtains information of two PRS measurement windows pre-configured on the network side through broadcast signaling, RRC signaling, DCI or dedicated positioning signaling, where the two measurement windows include a cell public measurement window and a non-cell public measurement window; and the PRS signal bandwidths and numerologies in the two measurement windows may be the same or different.

Step 2, the UE receives and measures a cell-specific first PRS in the cell public measurement window to obtain a first positioning measurement value, where the first positioning measurement value includes but is not limited to: RSTD, UE receiving and sending time difference and carrier phase, etc.

Step 3, the UE compares the first positioning measurement value with a first threshold value, and determines to apply for the UE-specific second PRS resource in the non-cell public measurement window from the network side based on the comparison result. If the error (for example: mean squared error or variance) of the first positioning measurement value is greater than the preset first threshold value, which means that the measurement accuracy cannot be met, then the UE applies for a new UE-specific second PRS resource with better measurement performance than first PRS resource from the network side. The first PRS resource is a resource configured for the first PRS, and the configuration information of the cell-specific first PRS may be carried through broadcast signaling, RRC signaling, DCI or dedicated positioning signaling to indicate the resource configured for the first PRS to the UE. The second PRS resource occupies a larger signal bandwidth in the frequency domain and occupies a larger number of OFDM symbols in the time domain compared with the first PRS resource. If the error (for example: mean squared error or variance) of the first positioning measurement value is not greater than the first threshold value, which means that the measurement accuracy has been reached, then the UE applies for a new UE-specific second PRS resource with the second best measurement performance than the first PRS resource from the network side. For example, the second PRS resource occupies a smaller signal bandwidth in the frequency domain and occupies a smaller number of OFDM symbols in the time domain compared with the first PRS resource, where the first threshold value may be pre-defined by the protocol or pre-configured on the network side.

Step 4, the UE receives configuration information of the UE-specific second PRS resource notified by the network side through broadcast signaling, RRC signaling, DCI or dedicated positioning signaling.

Step 5, the UE receives and measures the UE-specific second PRS resource in the non-cell public PRS measurement window to obtain a second positioning measurement value. In the non-cell public measurement window, although the signal bandwidths of PRSs from different cells may overlap in the frequency domain, the UE assumes that the signal bandwidths and numerologies of PRSs sent by different cells at the same time and frequency resources simultaneously do not conflict with each other, and the UE performs the PRS measurement by using the non-conflicting PRS signal bandwidths and numerologies to obtain the second positioning measurement value. Here, the definition of conflict is that different cells send PRSs with different numerologies to the target UE simultaneously in the same frequency range.

Step 6, the UE processes the first positioning measurement value in the cell public PRS measurement window and the second positioning measurement value obtained in the non-cell public PRS measurement window and obtains a third positioning measurement value; where the processing includes one of linear weighted combination, selecting the maximum value or selecting the minimum value.

Step 7, the UE reports the third positioning measurement value to the network side.

On the network side, the following processing flow is included.

Step 1, the network side pre-configures two PRS measurement windows for a UE, and notifies the UE of configuration information of the two windows through broadcast signaling, RRC signaling, DCI or dedicated positioning signaling, where the two measurement windows include a cell public measurement window and a non-cell public measurement window; and PRS signal bandwidths and numerologies in the two measurement windows may be the same or different. The network side divides the PRS resource into the cell-specific first PRS resource and the UE-specific second PRS resource, and the cell-specific first PRS resource and the UE-specific second PRS resource are respectively used to send PRSs in different windows.

Step 2, the network side configures the cell-specific first PRS resource of each cell in the cell public PRS measurement window, configures the same numerology and system signal bandwidth, and performs FDM or TDM multiplexing in different cells. The network side sends the cell-specific first PRS in the cell public measurement window for the UE to perform measurement and obtain a first positioning measurement value and for the UE to further apply for the UE-specific second PRS resource in the non-cell public measurement window from the network side.

Step 3, the network side performs configuration of the UE-specific second PRS resource according to requirement of the UE-specific second PRS fed back by the UE.

Step 4, the network side notifies the UE of the configuration information of the UE-specific second PRS resource through broadcast signaling, RRC signaling, DCI or dedicated positioning signaling.

Step 5, the network side configures the UE-specific second PRS resource of each cell in the non-cell public measurement window. The network side sends the UE-specific second PRS in the non-cell public measurement window for the UE to perform measurement and obtain a second positioning measurement value.

Step 6, the network side determines the position of the UE according to a third positioning measurement value reported by the terminal.

The methods for configuring the UE-specific second PRS resource on the network side described above will be introduced below. The network side may configure the UE-specific second PRS resource in the non-cell public PRS measurement window, and allocate and configure the PRS resource occupying the entire activated BandWidth Part (BWP) and having the same numerology based on the activated BWP of each UE. There are complete orthogonality, complete overlap and partial overlap relationships among M activated BWPs of one target UE in M different cells in the frequency domain, there are also complete orthogonality, complete overlap and non-complete overlap relationships among N*M activated BWPs of N target UEs in M different cells in the frequency domain. The PRS resource configurations are respectively determined according to the relationships among N*M activated BWPs of N target UEs (N>=1) that need to be positioned in the system in M different cells (M>=3). The processing is performed respectively for following two cases.

CASE1: complete orthogonality in the frequency domain (that is, the frequency-domain positions do not overlap); the PRS resources are configured respectively on N*M activated BWPs in M different cells (M>=3) for N target UEs (N>=1), where N target UEs are multiplexed by FDM or FDM+TDM in M different cells.

CASE2: incomplete orthogonality in the frequency domain (that is, the frequency-domain positions partially overlap or completely overlap), which may be realized by following two methods.

Method 1: preferentially multiplexing the PRSs of different target UEs by Time Division Multiplexing (TDM); and then multiplexing the PRSs of a same target UE in different cells by Frequency Division Multiplexing (FDM) or FDM+TDM (frequency division multiplexing combined with time division multiplexing). The FDM is performed for different cells with the same numerology for the same target UE. For example, there are two active UEs (UE1 and UE2) that need to be positioned in the system, and the quantity of cells monitored by each UE is 4. Firstly, the TDM multiplexing is performed for the downlink PRSs of the UE1 and UE2 (regardless of whether the numerologies of the activated BWPs of 4 cells that UE1 and UE2 are monitoring are the same), for example: the UE1 is transmitted in the first slot, and the UE2 is transmitted in the second slot. Then, for 4 cells where the same UE1 is located, the cells with the same numerology of the activated BWPs in the 4 cells are categorized into one group, the common BWP overlapping in the frequency domain among the activated BWPs in the group is selected as the effective PRS resource, the FDM or FDM+TDM multiplexing is used for the effective PRS resource, and the non-effective PRS resources are processed by frequency-domain muting, i.e., not sent, to reduce the interference from other cells when the UE performs the positioning measurement; and the cells with different numerologies are distinguished by the TDM.

Method 2: preferentially multiplexing PRSs of different target UEs with different numerologies in different cells by the TDM; and then multiplexing the PRSs of different target UEs with the same numerology in different cells by the FDM or FDM+TDM. For example: in the same carrier frequency band (FR), all active UEs are divided into two groups: the group 1 is UEs that use the same numerology1 for the activated BWPs of different cells; and the group 2 is UEs that use the same numerology2 for the activated BWPs of different cells. For example: for FR1, the SCS of the numerology1 is 15 kHz, and the SCS of the numerology2 is 30 kHz. The TDM multiplexing is used between the group 1 and group 2, for example, the group 1 and the group 2 occupy different slots respectively. For the group 1, the common BWP overlapping in the frequency domain among the activated BWPs of all UEs in the group 1 is selected as the effective PRS resource, the non-effective PRS resources are processed by frequency-domain muting, i.e., not sent, to reduce the interference from other users and other cells when the UE performs the positioning measurement, and the FDM or FDM+TDM multiplexing is used for the effective PRS resource; for the group 2, the common BWP overlapping in the frequency domain among the activated BWPs of all UEs in the group 2 is selected as the effective PRS resource, the non-effective PRS resources are processed by frequency-domain muting, and the FDM or FDM+TDM multiplexing is used for the effective PRS resource.

Several embodiments are given below for illustration.

A first embodiment is as follows.

In the first embodiment, in the processing step 1 on the UE side, the PRS signal bandwidths and numerologies in two measurement windows are different, and the UE obtains the information of two PRS measurement windows pre-configured on the network side through positioning dedicated signaling; the first, second and third positioning measurement values are RSTDs (i.e., TDOAs); the first threshold value in the processing step 2 on the UE side is pre-configured on the network side; and the processing in the processing step 4 on the UE side is selecting the maximum value.

In the processing step 2 on the network side, the network side performs TDM multiplexing on different cells; and in the processing step 3 on the network side, the network side performs the method for configuring the UE-specific second PRS resource according to the CASE1.

The processing flow on the UE side includes following steps.

Step 1, a UE obtains information of two PRS measurement windows pre-configured on the network side through positioning dedicated signaling, where the two measurement windows include a cell public measurement window and a non-cell public measurement window; and the PRS signal bandwidths and numerologies in the two measurement windows are different.

Step 2, the UE receives and measures a cell-specific first PRS in the cell public measurement window to obtain a first positioning measurement value RSTD.

Step 3, the UE compares the first positioning measurement value with a first threshold value, and determines to apply for the UE-specific second PRS resource in the non-cell public measurement window from the network side based on the comparison result. Assuming that the error (for example: mean squared error or variance) of the first positioning measurement value is greater than the first threshold value, which means that the measurement accuracy cannot be met, then the UE applies for a new UE-specific second PRS resource with better measurement performance than the first PRS resource from the network side, for example: the second PRS resource occupies a larger signal bandwidth in the frequency domain and occupies a larger number of OFDM symbols in the time domain.

Step 4, the UE receives configuration information of the UE-specific second PRS resource notified by the network side through positioning dedicated signaling.

Step 5, the UE receives and measures the UE-specific second PRS resource in the non-cell public PRS measurement window to obtain a second positioning measurement value. In the non-cell public measurement window, although the signal bandwidths of PRSs from different cells may overlap in the frequency domain, the UE assumes that the signal bandwidths and numerologies of PRSs sent by different cells at the same time and frequency resources simultaneously do not conflict with each other, and the UE performs the PRS measurement by using the non-conflicting PRS signal bandwidths and numerologies to obtain the second positioning measurement value. Here, the definition of conflict is that different cells send PRSs with different numerologies to the target UE simultaneously in the same frequency range.

Step 6, the UE adopts the processing method of selecting the maximum value and obtains a third positioning measurement value for the first positioning measurement value in the cell public PRS measurement window and the second positioning measurement value obtained in the non-cell public PRS measurement window.

Step 7, the UE reports the third positioning measurement value to the network side.

The processing flow on the network side includes following steps.

Step 1, the network side pre-configures two PRS measurement windows for a UE, and notifies the UE of configuration information of the two measurement windows through dedicated positioning signaling, where the two measurement windows include a cell public measurement window and a non-cell public measurement window; and PRS signal bandwidths and numerologies in the two measurement windows are different. The network side divides the PRS resource into the cell-specific first PRS resource and the UE-specific second PRS resource.

Step 2, the network side configures the cell-specific first PRS resource of each cell in the cell public PRS measurement window, configures the same numerology and system signal bandwidth, and performs TDM multiplexing in different cells. The network side sends the cell-specific first PRS in the cell public measurement window for the UE to perform measurement and obtain a first positioning measurement value and for the UE to further apply for the UE-specific second PRS resource in the non-cell public measurement window from the network side.

Step 3, the network side performs configuration of the UE-specific second PRS resource according to requirement of the UE-specific second PRS fed back by the UE.

Step 4, the network side notifies the UE of the configuration information of the UE-specific second PRS resource through dedicated positioning signaling.

Step 5, the network side configures the UE-specific second PRS resource of each cell in the non-cell public measurement window. The network side sends the UE-specific second PRS in the non-cell public measurement window for the UE to perform measurement and obtain a second positioning measurement value.

Step 6, the network side determines the position of the UE according to a third positioning measurement value reported by the terminal.

The methods for configuring the UE-specific second PRS resource on the network side in Step 3 will be introduced below. The network side may configure the UE-specific second PRS resource in the non-cell public PRS measurement window, and allocate and configure the PRS resource occupying the entire activated BWP and having the same numerology based on the activated BWP of each UE. There are complete orthogonality, complete overlap and partial overlap relationships among M activated BWPs of one target UE in M different cells in the frequency domain, there are also complete orthogonality, complete overlap and non-complete overlap relationships among N*M activated BWPs of N target UEs in M different cells in the frequency domain. The PRS resource configurations are respectively determined according to the relationships among N*M activated BWPs of N target UEs (N>=1) that need to be positioned in the system in M different cells (M>=3). The CASE1 is assumed below.

CASE1: complete orthogonality in the frequency domain (that is, the frequency-domain positions do not overlap); the PRS resources are configured respectively on N*M activated BWPs in M different cells (M>=3) for N target UEs (N>=1), where N target UEs are multiplexed by FDM or FDM+TDM in M different cells.

A second embodiment is as follows.

In the second embodiment, in the processing step 1 on the UE side, the PRS signal bandwidths and numerologies in two measurement windows are different, and the UE obtains the information of two PRS measurement windows pre-configured on the network side through RRC signaling; the first, second and third positioning measurement values are UE receiving and sending time differences; the first threshold value in the processing step 2 on the UE side is pre-configured on the network side; and the processing in the processing step 4 on the UE side is selecting the minimum value.

In the processing step 2 on the network side, the network side performs TDM multiplexing on different cells; and in the processing step 3 on the network side, the network side performs the method for configuring the UE-specific second PRS resource according to the Method 1 of the CASE2.

The processing flow on the UE side includes following steps.

Step 1, a UE obtains information of two PRS measurement windows pre-configured on the network side through RRC signaling, where the two measurement windows include a cell public measurement window and a non-cell public measurement window; and the PRS signal bandwidths and numerologies in the two measurement windows are different.

Step 2, the UE receives and measures a cell-specific first PRS in the cell public measurement window to obtain a first positioning measurement value "UE receiving and sending time difference".

Step 3, the UE compares the first positioning measurement value with a first threshold value, and determines to apply for the UE-specific second PRS resource in the non-cell public measurement window from the network side based on the comparison result. Assuming that the error (for example: mean squared error or variance) of the first positioning measurement value "UE receiving and sending time difference" is greater than the first threshold value, which means that the measurement accuracy cannot be met, then the UE applies for a new UE-specific second PRS resource with better measurement performance than the first PRS resource from the network side, for example: the second PRS resource occupies a larger signal bandwidth in the frequency domain and occupies a larger number of OFDM symbols in the time domain.

Step 4, the UE receives configuration information of the UE-specific second PRS resource notified by the network side through RRC signaling.

Step 5, the UE receives and measures the UE-specific second PRS resource in the non-cell public PRS measurement window to obtain a second positioning measurement value. In the non-cell public measurement window, although the signal bandwidths of PRSs from different cells may overlap in the frequency domain, the UE assumes that the signal bandwidths and numerologies of PRSs sent by different cells at the same time and frequency resources simultaneously do not conflict with each other, and the UE performs the PRS measurement by using the non-conflicting PRS signal bandwidths and numerologies to obtain the second positioning measurement value. Here, the definition of conflict is that different cells send PRSs with different numerologies to the target UE simultaneously in the same frequency range.

Step 6, the UE adopts the processing method of selecting the minimum value and obtains a third positioning measurement value for the first positioning measurement value in the cell public PRS measurement window and the second positioning measurement value obtained in the non-cell public PRS measurement window.

Step 7, the UE reports the third positioning measurement value to the network side.

The processing flow on the network side includes following steps.

Step 1, the network side pre-configures two PRS measurement windows for a UE, and notifies the UE of configuration information of the two measurement windows through RRC signaling, where the two measurement windows include a cell public measurement window and a non-cell public measurement window; and PRS signal bandwidths and numerologies in the two measurement windows are different. The network side divides the PRS resource into the cell-specific first PRS resource and the UE-specific second PRS resource.

Step 2, the network side configures the cell-specific first PRS resource of each cell in the cell public PRS measurement window, configures the same numerology and system signal bandwidth, and performs TDM multiplexing in different cells. The network side sends the cell-specific first PRS in the cell public measurement window for the UE to perform measurement and obtain a first positioning measurement value and for the UE to further apply for the UE-specific second PRS resource in the non-cell public measurement window from the network side.

Step 3, the network side performs configuration of the UE-specific second PRS resource according to requirement of the UE-specific second PRS fed back by the UE.

Step 4, the network side notifies the UE of the configuration information of the UE-specific second PRS resource through RRC signaling.

Step 5, the network side configures the UE-specific second PRS resource of each cell in the non-cell public measurement window. The network side sends the UE-specific second PRS in the non-cell public measurement window for the UE to perform measurement and obtain a second positioning measurement value.

Step 6, the network side determines the position of the UE according to a third positioning measurement value reported by the terminal.

The methods for configuring the UE-specific second PRS resource on the network side in Step 3 will be introduced below. The network side may configure the UE-specific second PRS resource in the non-cell public PRS measurement window, and allocate and configure the PRS resource occupying the entire activated BWP and having the same numerology based on the activated BWP of each UE. There are complete orthogonality, complete overlap and partial overlap relationships among M activated BWPs of one target UE in M different cells in the frequency domain, there are also complete orthogonality, complete overlap and non-complete overlap relationships among N*M activated BWPs of N target UEs in M different cells in the frequency domain. The PRS resource configurations are respectively determined according to the relationships among N*M activated BWPs of N target UEs (N>=1) that need to be positioned in the system in M different cells (M>=3). The Method 1 of the CASE2 is assumed for processing below.

CASE2: incomplete orthogonality in the frequency domain (that is, the frequency-domain positions partially overlap or completely overlap), which may be processed by the following Method 1.

Method 1: preferentially multiplexing the PRSs of different target UEs by TDM; and then multiplexing the PRSs of a same target UE in different cells by FDM or FDM+TDM. The FDM is performed on different cells with the same numerology for the same target UE. For example, there are two active UEs (UE1 and UE2) that need to be positioned in the system, and the quantity of cells monitored by each UE is 4. Firstly, the TDM multiplexing is performed for the downlink PRSs of the UE1 and UE2 (regardless of whether the numerologies of the activated BWPs of 4 cells that UE1 and UE2 are monitoring are the same), for example: the UE1 is transmitted in the first slot, and the UE2 is transmitted in the second slot. Then, for 4 cells where the same UE1 is located, the cells with the same numerology of the activated BWPs in the 4 cells are categorized into one group, the common BWP overlapping in the frequency domain among the activated BWPs in the group is selected as the effective PRS resource, and the non-effective PRS resources are processed by frequency-domain muting, i.e., not sent, to reduce the interference from other cells when the UE performs the positioning measurement; and the cells with different numerologies are distinguished by the TDM.

A third embodiment is as follows.

The steps of the third embodiment are the same as those of the second embodiment, and the processing method of step 3 on the network side is given below.

Figure 2:
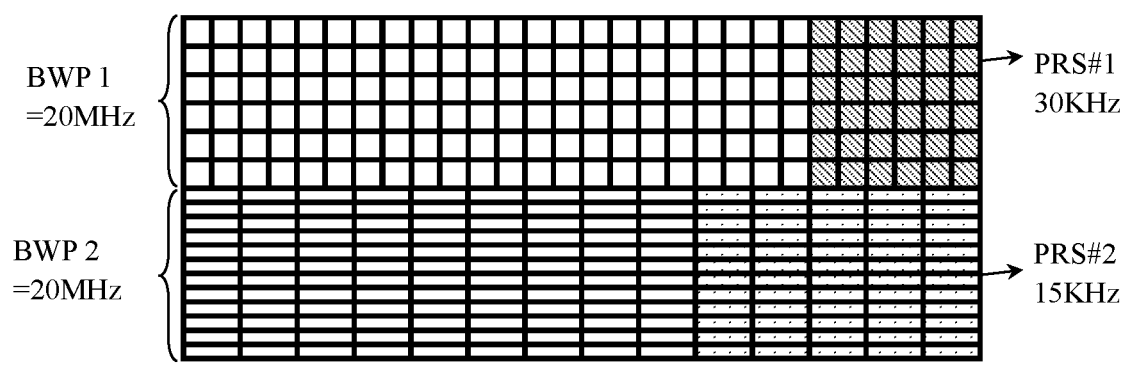
FIG. 2, FIG. 3, and FIG. 4 are schematic diagrams of BWPs from three different cells according to embodiments of the present application.
Figure 3:
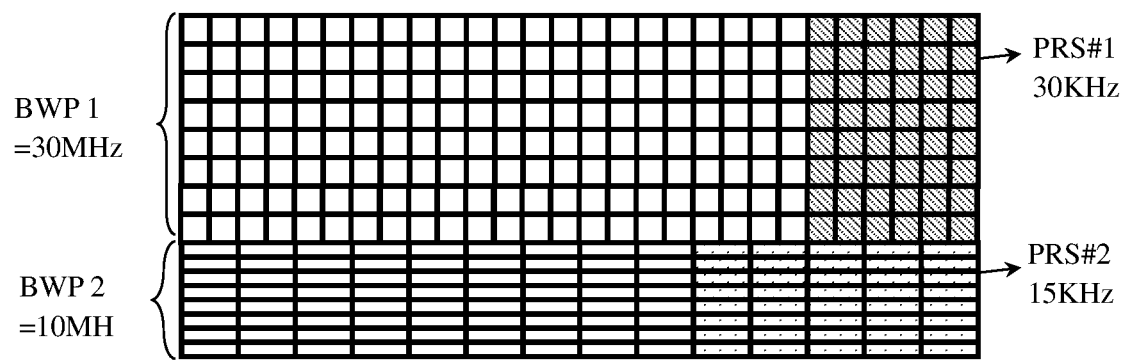
Figure 4:
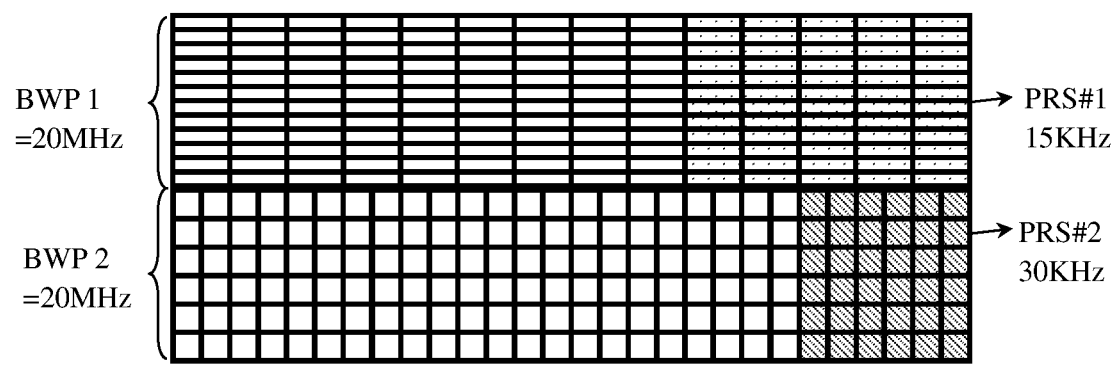

Assuming that only one target UE in the system applies for the UE-specific second PRS resource, the BWPs from three different cells are shown in FIGS. 2 to 4 respectively, where the SCSs of the BPW1 and BWP2 of the cell 1 are 30 KHz and 15 KHz respectively, and the signal bandwidths are 20 MHz and 20 MHz respectively; the SCSs of the BPW1 and BWP2 of the cell 2 are 30 KHz and 15 KHz respectively, and the signal bandwidths are 30 MHz and 10 MHz respectively; the SCSs of the BPW1 and BWP2 of the cell 3 are 15 KHz and 30 KHz respectively, and the signal bandwidths are both 20 MHz. The activated BWPs of the three cells are all BWP1.

1) For the cell 1 shown in FIG. 2 and the cell 2 shown in FIG. 3, since the numerology of the BWP1 of the cell 1 is the same as that of the BWP1 of the cell 2 and only the frequency signal bandwidths are different, the actual sending signal bandwidth of PRS #1 is determined based on the common resource where the frequency-domain resources of the cell 1 and cell 2 intersect, that is, the signal bandwidth of 20 MHz occupied by the BWP1 of the cell 1 is occupied.

2) For the cell 1 shown in FIG. 2 and the cell 3 shown in FIG. 4, since the BWP1 of the cell 1 and the BWP1 of the cell 3 correspond to the same frequency signal bandwidth of 20 MHz but the numerologies are different, the TDM multiplexing needs to be used for transmission within one PRS occasion. For example: 1 ms is divided into two durations of 0.5 ms, at which the PRSs of the cell 1 and cell 3 are transmitted respectively. In one slot with SCS=15 KHz (the duration is 1 ms), the BWP1 of the cell 1 occupies the first 14 OFDM symbols with SCS=30 KHz (equivalent to 7 OFDM symbols with SCS=15 KHz), and the BWP1 of the cell 3 occupies the last 7 OFDM symbols with SCS=15 KHz.

Figure 5:
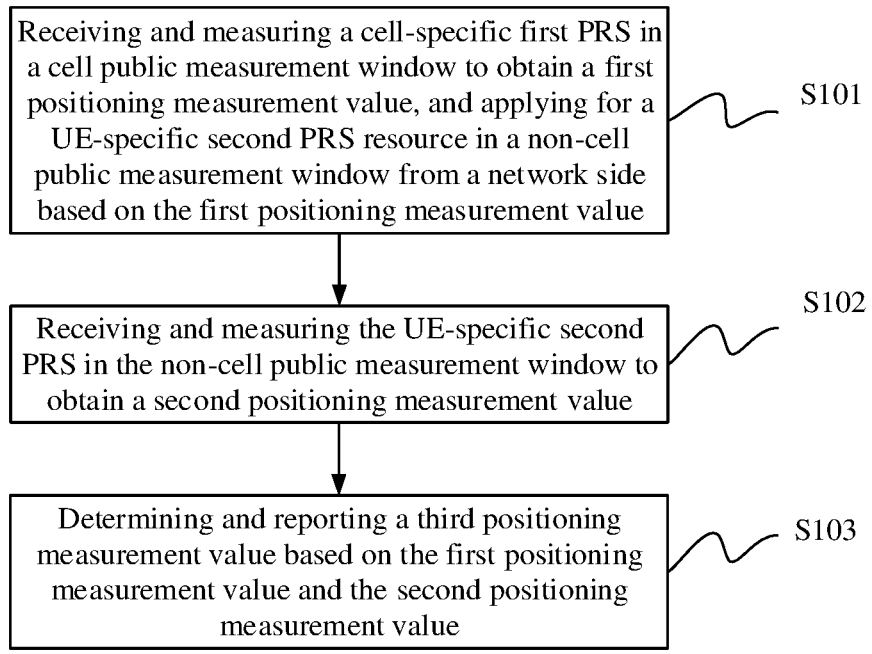
FIG. 5 is a schematic flowchart of a signal communication method on the terminal side according to an embodiment of the present application.

In summary, referring to FIG. 5, on the terminal side, a signal communication method provided by an embodiment of the present application includes following steps.

S101: receiving and measuring a cell-specific first PRS in a cell public measurement window to obtain a first positioning measurement value, and applying for a UE-specific second PRS resource in a non-cell public measurement window from a network side based on the first positioning measurement value.

S102: receiving and measuring the UE-specific second PRS in the non-cell public measurement window to obtain a second positioning measurement value.

S103: determining and reporting a third positioning measurement value based on the first positioning measurement value and the second positioning measurement value.

Through this method, the cell-specific first PRS is received and measured in the cell public measurement window to obtain the first positioning measurement value, and the UE-specific second PRS resource in the non-cell public measurement window is applied for from the network side based on the first positioning measurement value; the UE-specific second PRS is received and measured in the non-cell public measurement window to obtain the second positioning measurement value; and the third positioning measurement value is determined and reported based on the first positioning measurement value and the second positioning measurement value, thereby implementing the PRS communication supporting different signal bandwidths and numerologies. Compared with the related art, the complexity and delay impact of additional RF handover are decreased, and the additional processing complexity and delay of the gNB and UE are reduced.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, applying for the UE-specific second PRS resource in the non-cell public measurement window from the network side based on the first positioning measurement value, includes: comparing the first positioning measurement value with a preset threshold value, and applying for the UE-specific second PRS resource in the non-cell public measurement window from the network side according to a comparison result.

Optionally, the method further includes: receiving one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of the UE-specific second PRS resource.

Optionally, the third positioning measurement value is determined based on the first positioning measurement value and the second positioning measurement value by one of: linear weighted combination; selecting a maximum value; selecting a minimum value.

Figure 6:
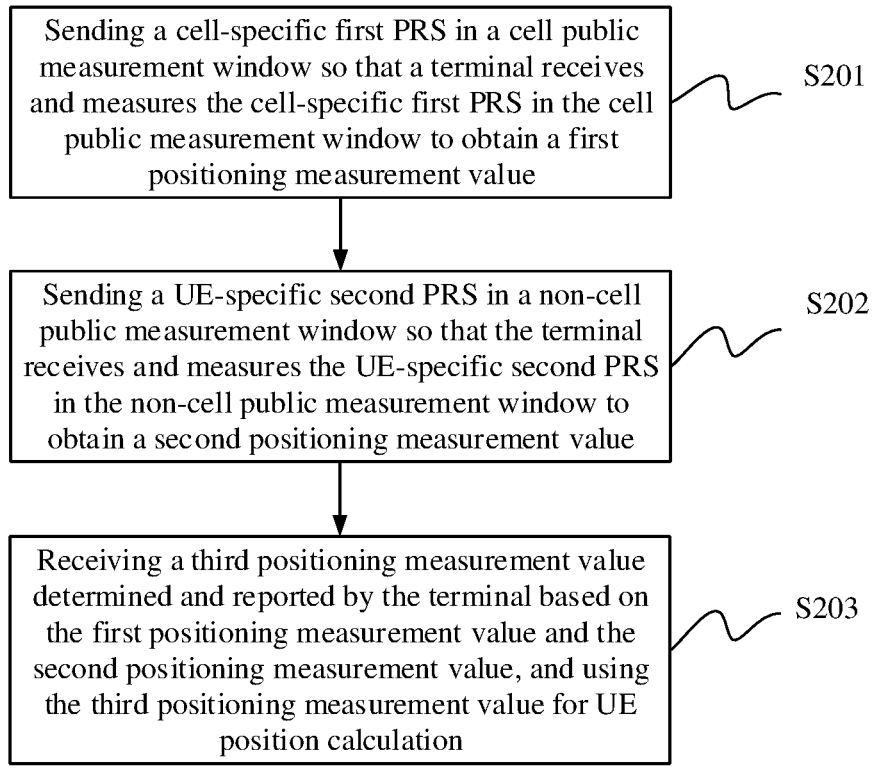
FIG. 6 is a schematic flowchart of a signal communication method on the network side according to an embodiment of the present application.

Correspondingly, on the network side, referring to FIG. 6, a signal communication method provided by an embodiment of the present application includes following steps.

S201: sending a cell-specific first PRS in a cell public measurement window so that a terminal receives and measures the cell-specific first PRS in the cell public measurement window to obtain a first positioning measurement value.

S202: sending a UE-specific second PRS in a non-cell public measurement window so that the terminal receives and measures the UE-specific second PRS in the non-cell public measurement window to obtain a second positioning measurement value.

S203: receiving a third positioning measurement value determined and reported by the terminal based on the first positioning measurement value and the second positioning measurement value, and using the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the method further includes: notifying the terminal of one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of a UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Figure 7:
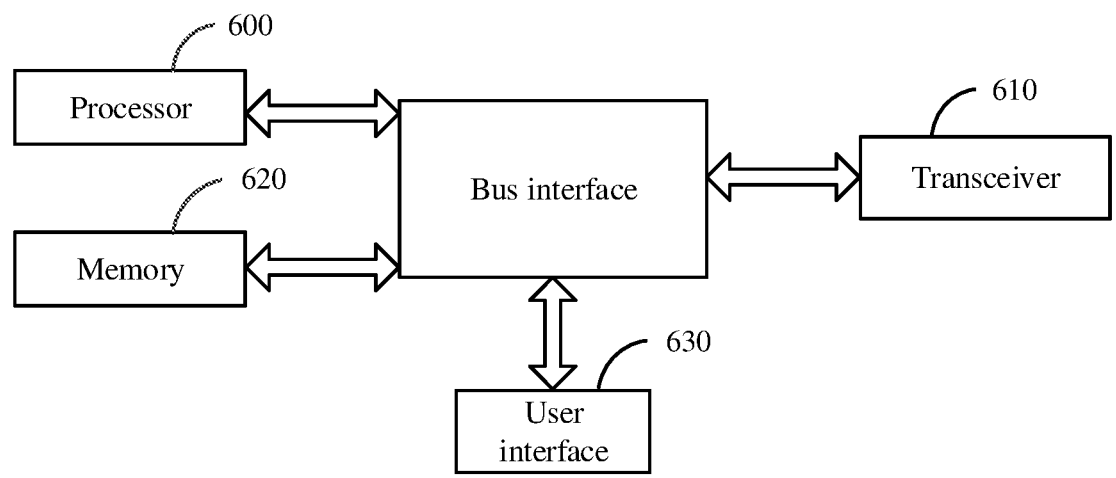
FIG. 7 is a structural schematic diagram of a signal communication apparatus on the terminal side according to an embodiment of the present application.

On the terminal side, referring to FIG. 7, a signal communication apparatus provided by an embodiment includes: a memory 620 configured to store program instructions; a processor 600 configured to invoke the program instructions stored in the memory, and perform according to an obtained program: receiving and measuring a cell-specific first PRS in a cell public measurement window to obtain a first positioning measurement value, and applying for a UE-specific second PRS resource in a non-cell public measurement window from a network side based on the first positioning measurement value; receiving and measuring a UE-specific second PRS in the non-cell public measurement window to obtain a second positioning measurement value; determining and reporting a third positioning measurement value based on the first positioning measurement value and the second positioning measurement value.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, applying for the UE-specific second PRS resource in the non-cell public measurement window from the network side based on the first positioning measurement value, includes: comparing the first positioning measurement value with a preset threshold value, and applying for the UE-specific second PRS resource in the non-cell public measurement window from the network side according to a comparison result.

Optionally, the processor 600 is further configured to: receive one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of the UE-specific second PRS resource.

Optionally, the third positioning measurement value is determined based on the first positioning measurement value and the second positioning measurement value by one of: linear weighted combination; selecting a maximum value; selecting a minimum value.

The processor applying for the UE-specific second PRS resource in the non-cell public measurement window from the network side based on the first positioning measurement value, includes: applying for a second PRS resource occupying a larger signal bandwidth and/or more OFDM symbols than a first PRS resource when an error of the first positioning measurement value is greater than a first threshold value, where the first PRS resource is the resource configured for the first PRS from the network side; applying for a PRS resource occupying a smaller signal bandwidth and/or fewer OFDM symbols than the first PRS resource from the network side when the error of the first positioning measurement value is not greater than the first threshold value.

A transceiver 610 is configured to receive and send data under control of the processor 600.

Here, in FIG. 7, the bus architecture may include any quantities of interconnected buses and bridges, and link various circuits of one or more processors represented by the processor 600 and the memory represented by the memory 620. The bus architecture may further link various other circuits such as a peripheral device, a voltage regulator and a power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface capable of internally connecting or externally connecting with the required devices, and the connected devices include but not limited to a keypad, a display, a loudspeaker, a microphone, a joystick and the like.

The processor 600 is responsible for managing the bus architecture and general processing, and the memory 620 may store the data used by the processor 600 when performing the operations.

Optionally, the processor 600 may be Central Processing Unit (CPU), Application Specific Integrated Circuit (ASIC), Field-Programmable Gate Array (FPGA) or Complex Programmable Logic Device (CPLD).

Figure 8:
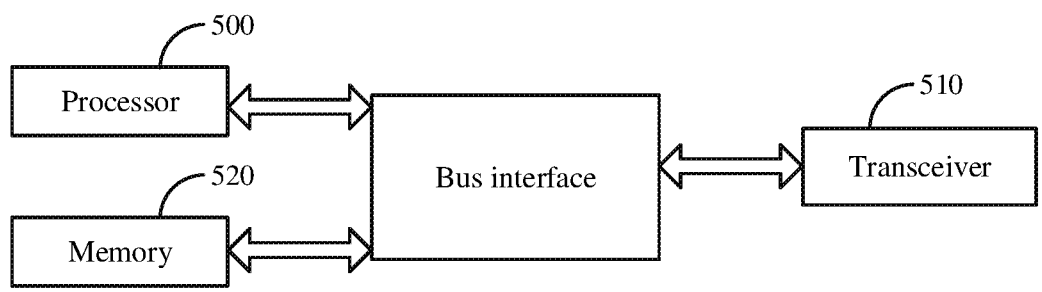
FIG. 8 is a structural schematic diagram of a signal communication apparatus on the network side according to an embodiment of the present application.

Correspondingly, on the network side, referring to FIG. 8, a signal communication apparatus provided by an embodiment of the present application includes: a memory 520 configured to store program instructions; a processor 500 configured to invoke the program instructions stored in the memory, and perform according to an obtained program: sending a cell-specific first PRS in a cell public measurement window so that a terminal receives and measures the cell-specific first PRS in the cell public measurement window to obtain a first positioning measurement value; sending a UE-specific second PRS in a non-cell public measurement window so that the terminal receives and measures the UE-specific second PRS in the non-cell public measurement window to obtain a second positioning measurement value; receiving a third positioning measurement value determined and reported by the terminal based on the first positioning measurement value and the second positioning measurement value, and using the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the processor 500 is further configured to: notify the terminal of one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of a UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Optionally, the processor is further configured to: determine a relationship among N*M activated BWPs of N target UEs that need to be positioned in M different cells, where N is greater than or equal to 1, and M is greater than or equal to 3; configure PRS resources respectively on the N*M activated BWPs in the M different cells for the N target UEs in case of complete orthogonality in frequency domain, where the N target UEs are multiplexed by FDM or by FDM combined with TDM in the M different cells; multiplex PRSs of different target UEs by the TDM and then multiplex PRSs of a same target UE in different cells by the FDM or by the FDM combined with the TDM in case of incomplete orthogonality in frequency domain; or multiplex PRSs of different target UEs with different numerologies in different cells by the TDM and then multiplex PRSs of different target UEs with a same numerology in different cells by the FDM or by the FDM combined with the TDM in case of incomplete orthogonality in frequency domain.

A transceiver 510 is configured to receive and send data under control of the processor 500.

Here, in FIG. 8, the bus architecture may include any quantities of interconnected buses and bridges, and link various circuits of one or more processors represented by the processor 500 and the memory represented by the memory 520. The bus architecture may further link various other circuits such as a peripheral device, a voltage regulator and a power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 9:
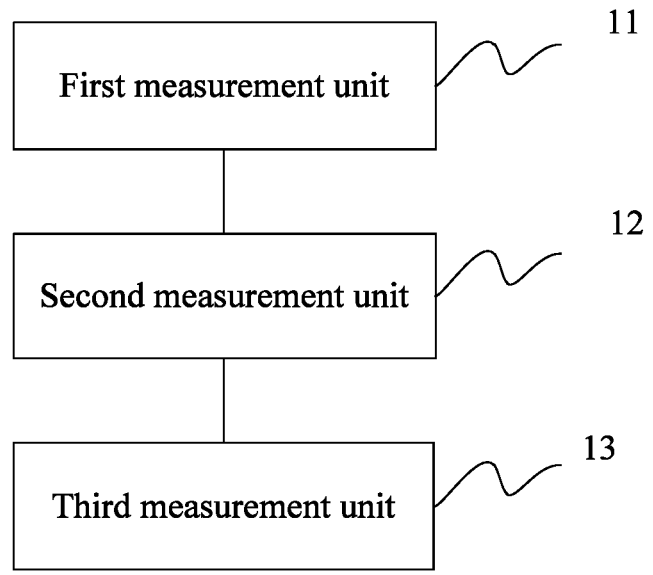
FIG. 9 is a structural schematic diagram of another signal communication apparatus on the terminal side according to an embodiment of the present application.

On the terminal side, referring to FIG. 9, another signal communication apparatus provided by an embodiment of the present application includes: a first measurement unit 11 configured to receive and measure a cell-specific first PRS in a cell public measurement window to obtain a first positioning measurement value, and apply for a UE-specific second PRS resource in a non-cell public measurement window from a network side based on the first positioning measurement value; a second measurement unit 12 configured to receive and measure a UE-specific second PRS in the non-cell public measurement window to obtain a second positioning measurement value; a third measurement unit 13 configured to determine and report a third positioning measurement value based on the first positioning measurement value and the second positioning measurement value.

Optionally, a signal bandwidth used to receive and measure the first PRS in the cell public measurement window is the same as or different from a signal bandwidth used to receive and measure the second PRS in the non-cell public measurement window; a numerology used to receive and measure the first PRS in the cell public measurement window is the same as or different from a numerology used to receive and measure the second PRS in the non-cell public measurement window.

Optionally, the first measurement unit is configured to: compare the first positioning measurement value with a preset threshold value, and apply for the UE-specific second PRS resource in the non-cell public measurement window from the network side according to a comparison result.

Optionally, the apparatus further includes a unit that receives one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of the UE-specific second PRS resource.

Optionally, the third measurement unit determines the third positioning measurement value based on the first positioning measurement value and the second positioning measurement value by one of: linear weighted combination; selecting a maximum value; selecting a minimum value.

Optionally, the first measurement unit applying for the UE-specific second PRS resource in the non-cell public measurement window from the network side based on the first positioning measurement value, includes: applying for a second PRS resource occupying a larger signal bandwidth and/or more OFDM symbols than a first PRS resource when an error of the first positioning measurement value is greater than a first threshold value, where the first PRS resource is the resource configured for the first PRS from the network side; applying for a PRS resource occupying a smaller signal bandwidth and/or fewer OFDM symbols than the first PRS resource from the network side when the error of the first positioning measurement value is not greater than the first threshold value.

Figure 10:
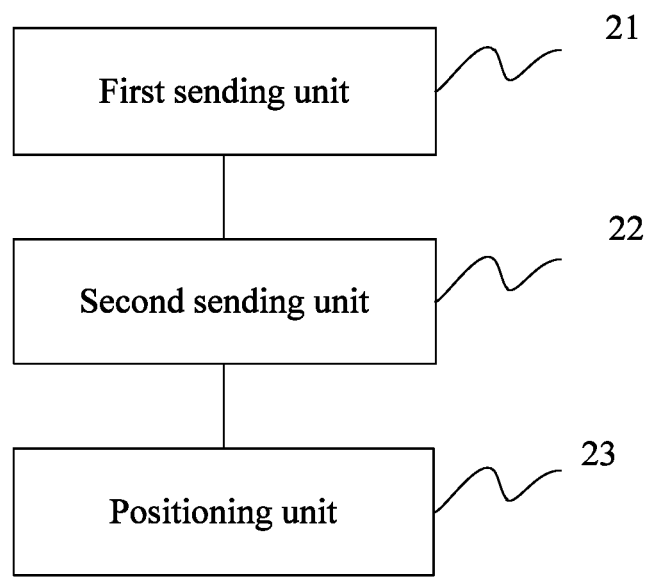
FIG. 10 is a structural schematic diagram of another signal communication apparatus on the network side according to an embodiment of the present application.

On the network side, referring to FIG. 10, an embodiment of the present application provides another signal communication apparatus, including: a first sending unit 21 configured to send a cell-specific first PRS in a cell public measurement window so that a terminal receives and measures the cell-specific first PRS in the cell public measurement window to obtain a first positioning measurement value; a second sending unit 22 configured to send a UE-specific second PRS in a non-cell public measurement window so that the terminal receives and measures the UE-specific second PRS in the non-cell public measurement window to obtain a second positioning measurement value; a positioning unit 23 configured to receive a third positioning measurement value determined and reported by the terminal based on the first positioning measurement value and the second positioning measurement value, and use the third positioning measurement value for UE position calculation.

Optionally, a signal bandwidth used to transmit the first PRS in the cell public measurement window is the same as or different from a signal bandwidth used to transmit the second PRS in the non-cell public measurement window; a numerology used to transmit the first PRS in the cell public measurement window is the same as or different from a numerology used to transmit the second PRS in the non-cell public measurement window.

Optionally, the positioning unit is further configured to: notify the terminal of one or more of following configuration information through broadcast signaling, RRC signaling, DCI or dedicated positioning signaling: configuration information of the cell public measurement window; configuration information of the non-cell public measurement window; configuration information of a cell-specific first PRS resource; configuration information of a UE-specific second PRS resource.

Optionally, the configuration information of the UE-specific second PRS resource is determined based on an application of the UE-specific second PRS resource in the non-cell public measurement window sent by the terminal to a network side based on the first positioning measurement value when receiving the application.

Optionally, the positioning unit is further configured to: determine a relationship among N*M activated BWPs of N target UEs that need to be positioned in M different cells, where N is greater than or equal to 1, and M is greater than or equal to 3; configure PRS resources respectively on the N*M activated BWPs in the M different cells for the N target UEs in case of complete orthogonality in frequency domain, where the N target UEs are multiplexed by FDM or by FDM combined with TDM in the M different cells; multiplex PRSs of different target UEs by the TDM and then multiplex PRSs of a same target UE in different cells by the FDM or by the FDM combined with the TDM in case of incomplete orthogonality in frequency domain; or multiplex PRSs of different target UEs with different numerologies in different cells by the TDM and then multiplex PRSs of different target UEs with a same numerology in different cells by the FDM or by the FDM combined with the TDM in case of incomplete orthogonality in frequency domain.

It should be noted that the division of units in embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units may be implemented in the form of hardware, or may be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the related art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by embodiments of the present application.

The processor invokes the program instructions stored in the memory and is configured to perform any one of the methods provided by embodiments of the present application in accordance with the obtained program instructions.

An embodiment of the present application provides a computer storage medium for storing the computer program instructions used by the apparatuses provided by embodiments of the present application described above, where the computer storage medium contains the program for performing any one of the methods provided by embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by embodiments of the present application may be applied to the terminal devices, and may also be applied to the network devices.

Here, the terminal device may also be referred to as the User Equipment ("UE" for short), Mobile Station ("MS" for short), Mobile Terminal ("MT" for short) or the like. Optionally, the terminal may has the ability of communicating with one or more core networks via the Radio Access Network (RAN). For example, the terminal may be a mobile telephone (or called "cellular" telephone), or a computer with the mobile property. For example, the terminal may also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station may be the BTS in the GSM or CDMA, or may be the NodeB in the WCDMA, or may be the NodeB or eNB or e-NodeB (evolutional Node B) in the LTE, or may be the gNB in the 5G system, or the like, which is not limited in embodiments of the present application.

The processing flows of the above methods may be implemented by a software program, which may be stored in a storage medium. When the stored software program is invoked, the above method steps are performed.

It should be understood by those skilled in the art that embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions may also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A signal communication method, the method comprising:
   receiving and measuring a cell-specific first Positioning Reference Signal, PRS, in a cell public measurement window to obtain a first positioning measurement value, and applying for a UE-specific second PRS resource in a non-cell public measurement window from a network side based on the first positioning measurement value;
   receiving and measuring the UE-specific second PRS in the non-cell public measurement window to obtain a second positioning measurement value;
   determining and reporting a third positioning measurement value based on the first positioning measurement value and the second positioning measurement value.

2. The method according to claim 1, wherein a signal bandwidth used to receive and measure the first PRS in the cell public measurement window is the same as or different from a signal bandwidth used to receive and measure the second PRS in the non-cell public measurement window;
   a numerology used to receive and measure the first PRS in the cell public measurement window is the same as or different from a numerology used to receive and measure the second PRS in the non-cell public measurement window.

3. The method according to claim 1, wherein applying for the UE-specific second PRS resource in the non-cell public measurement window from the network side based on the first positioning measurement value, comprises:
   comparing the first positioning measurement value with a preset threshold value, and applying for the UE-specific second PRS resource in the non-cell public measurement window from the network side according to a comparison result.

4. The method according to claim 1, wherein the method further comprises: receiving one or more of following configuration information through broadcast signaling, Radio Resource Control, RRC, signaling, Downlink Control Information, DCI, or dedicated positioning signaling:
   configuration information of the cell public measurement window;
   configuration information of the non-cell public measurement window;
   configuration information of the cell-specific first PRS resource;

configuration information of the UE-specific second PRS resource.

5. The method according to claim 1, wherein the third positioning measurement value is determined based on the first positioning measurement value and the second positioning measurement value by one of:
  linear weighted combination;
  selecting a maximum value;
  selecting a minimum value.

6. The method according to claim 1, wherein applying for the UE-specific second PRS resource in the non-cell public measurement window from the network side based on the first positioning measurement value, comprises:
  applying for a second PRS resource occupying a larger signal bandwidth and/or more OFDM symbols than a first PRS resource when an error of the first positioning measurement value is greater than a first threshold value, wherein the first PRS resource is the resource configured for the first PRS from the network side;
  applying for a second PRS resource occupying a smaller signal bandwidth and/or fewer OFDM symbols than the first PRS resource from the network side when the error of the first positioning measurement value is not greater than the first threshold value.

7. A signal communication method, the method comprising:
  sending a cell-specific first Positioning Reference Signal, PRS, in a cell public measurement window;
  sending a UE-specific second PRS in a non-cell public measurement window;
  receiving a third positioning measurement value determined and reported by a terminal based on a first positioning measurement value and a second positioning measurement value, and using the third positioning measurement value for UE position calculation;
  wherein the first positioning measurement value is obtained by the terminal receiving and measuring the cell-specific first PRS in the cell public measurement window, the second positioning measurement value is obtained by the terminal receiving and measuring the UE-specific second PRS in the non-cell public measurement window.

8. The method according to claim 7, wherein a signal bandwidth used to transmit the first PRS in the cell public measurement window is the same as or different from a signal bandwidth used to transmit the second PRS in the non-cell public measurement window;
  a numerology used to transmit the first PRS in the cell public measurement window is the same as or different from a numerology used to transmit the second PRS in the non-cell public measurement window.

9. The method according to claim 7, wherein the method further comprises: notifying the terminal of one or more of following configuration information through broadcast signaling, Radio Resource Control, RRC, signaling, Downlink Control Information, DCI, or dedicated positioning signaling:
  configuration information of the cell public measurement window;
  configuration information of the non-cell public measurement window;
  configuration information of the cell-specific first PRS resource;
  configuration information of the UE-specific second PRS resource;
  wherein the configuration information of the UE-specific second PRS resource is determined based on an application of the UE-specific second PRS resource in the non-cell public measurement window sent by the terminal to a network side based on the first positioning measurement value when receiving the application.

10. The method according to claim 9, wherein the method further comprises:
  determining a relationship among N*M activated BandWidth Parts, BWPs, of N target UEs that need to be positioned in M different cells, wherein N is greater than or equal to 1, and M is greater than or equal to 3;
  configuring PRS resources respectively on the N*M activated BWPs in the M different cells for the N target UEs in case of complete orthogonality in frequency domain, wherein the N target UEs are multiplexed by Frequency Division Multiplexing, FDM, or by the FDM combined with Time Division Multiplexing, TDM, in the M different cells;
  multiplexing PRSs of different target UEs by the TDM and then multiplexing PRSs of a same target UE in different cells by the FDM or by the FDM combined with the TDM in case of incomplete orthogonality in frequency domain; or multiplexing PRSs of different target UEs with different numerologies in different cells by the TDM and then multiplexing PRSs of different target UEs with a same numerology in different cells by the FDM or by the FDM combined with the TDM in case of incomplete orthogonality in frequency domain.

11. A signal communication apparatus, the apparatus comprising:
  a memory configured to store program instructions;
  a processor configured to invoke the program instructions stored in the memory, and perform operations according to claim 7.

12. The apparatus according to claim 11, wherein a signal bandwidth used to transmit the first PRS in the cell public measurement window is the same as or different from a signal bandwidth used to transmit the second PRS in the non-cell public measurement window;
  a numerology used to transmit the first PRS in the cell public measurement window is the same as or different from a numerology used to transmit the second PRS in the non-cell public measurement window.

13. The apparatus according to claim 11, wherein the processor is further configured to: notify the terminal of one or more of following configuration information through broadcast signaling, Radio Resource Control, RRC, signaling, Downlink Control Information, DCI, or dedicated positioning signaling:
  configuration information of the cell public measurement window;
  configuration information of the non-cell public measurement window;
  configuration information of the cell-specific first PRS resource;
  configuration information of the UE-specific second PRS resource;
  wherein the configuration information of the UE-specific second PRS resource is determined based on an application of the UE-specific second PRS resource in the non-cell public measurement window sent by the terminal to a network side based on the first positioning measurement value when receiving the application.

14. The apparatus according to claim 13, wherein the processor is further configured to:
  determine a relationship among N*M activated BandWidth Parts, BWPs, of N target UEs that need to be positioned in M different cells, wherein N is greater than or equal to 1, and M is greater than or equal to 3;

configure PRS resources respectively on the N*M activated BWPs in the M different cells for the N target UEs in case of complete orthogonality in frequency domain, wherein the N target UEs are multiplexed by Frequency Division Multiplexing, FDM, or by the FDM combined with Time Division Multiplexing, TDM, in the M different cells;

multiplex PRSs of different target UEs by the TDM and then multiplex PRSs of a same target UE in different cells by the FDM or by the FDM combined with the TDM in case of incomplete orthogonality in frequency domain; or multiplex PRSs of different target UEs with different numerologies in different cells by the TDM and then multiplex PRSs of different target UEs with a same numerology in different cells by the FDM or by the FDM combined with the TDM in case of incomplete orthogonality in frequency domain.

15. A signal communication apparatus, the apparatus comprising:

a memory configured to store program instructions;

a processor configured to invoke the program instructions stored in the memory, and perform according to an obtained program:

receiving and measuring a cell-specific first Positioning Reference Signal, PRS, in a cell public measurement window to obtain a first positioning measurement value, and applying for a UE-specific second PRS resource in a non-cell public measurement window from a network side based on the first positioning measurement value;

receiving and measuring the UE-specific second PRS in the non-cell public measurement window to obtain a second positioning measurement value;

determining and reporting a third positioning measurement value based on the first positioning measurement value and the second positioning measurement value.

16. The apparatus according to claim 15, wherein a signal bandwidth used to receive and measure the first PRS in the cell public measurement window is the same as or different from a signal bandwidth used to receive and measure the second PRS in the non-cell public measurement window;

a numerology used to receive and measure the first PRS in the cell public measurement window is the same as or different from a numerology used to receive and measure the second PRS in the non-cell public measurement window.

17. The apparatus according to claim 15, wherein applying for the UE-specific second PRS resource in the non-cell public measurement window from the network side based on the first positioning measurement value, comprises:

comparing the first positioning measurement value with a preset threshold value, and applying for the UE-specific second PRS resource in the non-cell public measurement window from the network side according to a comparison result.

18. The apparatus according to claim 15, wherein the processor is further configured to: receive one or more of following configuration information through broadcast signaling, Radio Resource Control, RRC, signaling, Downlink Control Information, DCI, or dedicated positioning signaling:

configuration information of the cell public measurement window;

configuration information of the non-cell public measurement window;

configuration information of the cell-specific first PRS resource;

configuration information of the UE-specific second PRS resource.

19. The apparatus according to claim 15, wherein the third positioning measurement value is determined based on the first positioning measurement value and the second positioning measurement value by one of:

linear weighted combination;

selecting a maximum value;

selecting a minimum value.

20. The apparatus according to claim 15, wherein the processor applying for the UE-specific second PRS resource in the non-cell public measurement window from the network side based on the first positioning measurement value, comprises:

applying for a second PRS resource occupying a larger signal bandwidth and/or more OFDM symbols than a first PRS resource when an error of the first positioning measurement value is greater than a first threshold value, wherein the first PRS resource is the resource configured for the first PRS from the network side;

applying for a second PRS resource occupying a smaller signal bandwidth and/or fewer OFDM symbols than the first PRS resource from the network side when the error of the first positioning measurement value is not greater than the first threshold value.

* * * * *